MENSTRUAL CYCLE CALCULATING DEVICE

Filed March 26, 1956

INVENTOR.

Juan Gomez Rodriquez

1

2,808,206

MENSTRUAL CYCLE CALCULATING DEVICE

Juan Gomez-Rodriguez, Mexico City, Mexico

Application March 26, 1956, Serial No. 574,026

4 Claims. (Cl. 235—88)

This invention relates to menstrual cycle calculating devices.

It is an object of the present invention to provide a menstrual cycle calculating device which will enable rapid calculation of the fertile periods in the menstrual cycles of women and which will simultaneously indicate the first day of the next menstruation.

It is another object of the present invention to provide a calculating device of the above type which takes into account the variation in the menstrual cycle of the individual woman.

Other objects of the invention are to provide a menstrual cycle calculating device bearing the above objects in mind which is of simple construction, has a minimum number of parts, inexpensive to manufacture and efficient in use.

For other objects and for a better understanding of the invention, reference may be had to the following detailed description taken in connection with the accompanying drawing, in which.

Figure 1:
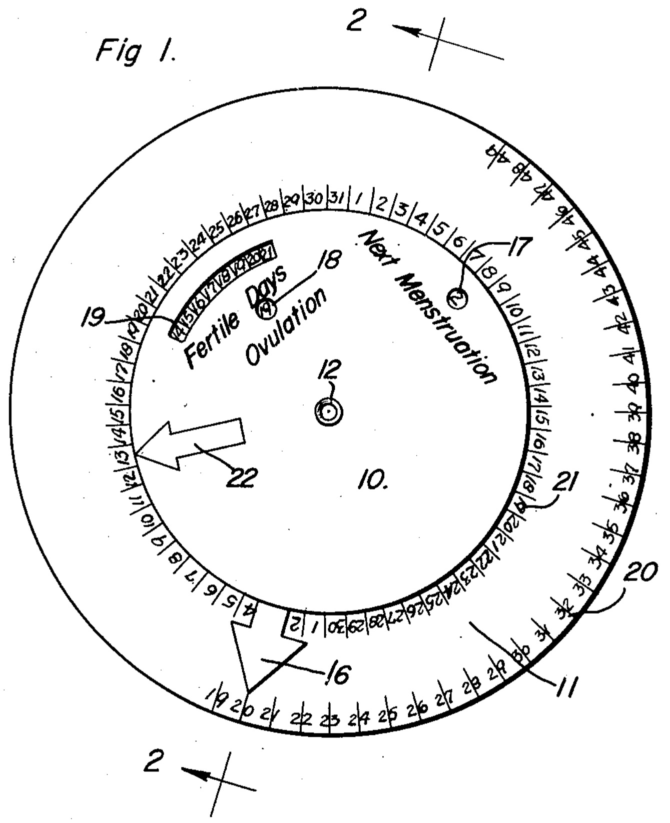
Figure 1 is a top plan view of a preferred embodiment of the present invention.

Referring now more in detail to the drawing, the menstrual cycle calculating device embodying the features of the present invention includes a top plate 10 and a bottom plate 11 of paperboard, celluloid or synthetic plastic or other suitable material, the plates 10 and 11 being substantially circular in shape and being rotatably connected in concentric relationship to each other by means of the grommet 12 or the like.

Figure 2:
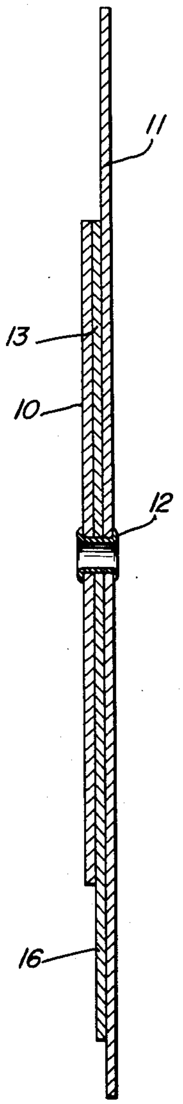
Fig. 2 is a vertical sectional view thereof taken along the line 2—2 of Fig. 1.

Rotatably mounted intermediate the plates 10 and 11 is a calendar disc or dial 13, the dial 13 being rotatably mounted on the grommet 12 intermediate the plates 10 and 11 (Fig. 2).

Figure 3:
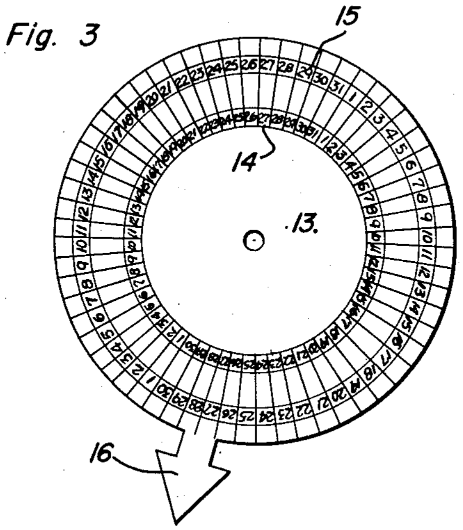
Fig. 3 is a top plan view of the intermediate disc forming a part of the invention.

The disc or dial 13, as shown in Fig. 3, is provided with an inner circularly arranged row of indicia 14, divided into 61 parts. The indicia 14 consist of two consecutive series of numbers, the first one "1 to 30" inclusive and the second from "1 to 31" inclusive. The disc or dial 13 is also provided with an outer circularly arranged row of indicia 15 also divided into 61 parts and aligned with the parts of the row of indicia 14, the numbers in the parts of the indicia 15 being identical with those in the parts of the indicia 14. The dial 13 adjacent the numbers 27 and 28 is integrally formed with the arrow 16 for a purpose which will hereinafter become clear.

The top or face plate 10 is provided with a circular window 17 with which one of the indicia 15 is adapted to be aligned upon movement of the disc or dial 13. The window 17 preferably has a suitable identifying legend adjacent thereto on the top of the plate 10, for example "Next Menstruation."

The top plate 10 is also provided with a window 18 and with which a selected one of the indicia 14 is adapted to be aligned when one of the indicia 15 is aligned with the window 17. The window 18 is also provided with suitable legend, for example "Ovulation." The window 17 is adapted to display a date indication which corresponds to a date in advance of the date of the first day of menstruation to be hereinafter described.

The top plate 10 is also provided with an elongated arcuate window 19 which is adapted to be aligned with the indicia 15 of the dial 13 and which bears the legend "Fertile Days." The window 19 is located with respect to the window 17 and the date of the first day of the menstruation to be hereinafter described so as to display a selected portion of the indicia 15 corresponding to the fertile period for the specific menstrual cycle.

The bottom plate 11 is provided with an outer circularly arranged series of indicia 20 (Fig. 1) provided with 31 lines, each of the lines provided with the numbers "19 through 49" inclusive, the digits of each of the foregoing numbers being arranged on opposite sides of the lines, substantially as illustrated. The indicia 20 correspond to the duration of the menstrual cycle for the individual woman.

The bottom plate 11 is also provided with an inner circularly arranged row of indicia 21 adjacent the peripheral edge of the front plate 10 provided into 61 parts. The indicia 21 consist of two consecutive series of numbers, the first from "1 to 30" inclusive and the second from "1 to 31" preferably, inclusive. The indicia 21 are adapted to cooperate with the arrow 22 provided on the front plate 10 to indicate the first date of the last menstruation.

In operation, the arrow 16 is first rotated so that it indicates the duration of the menstrual cycle on the scale or indicia 20, pointing to the particular line corresponding to the duration (Fig. 1). This represents the shortest period of the oscillation of the menstrual cycle of the particular individual. The arrow 22 is then rotated to cooperate with the scale or indicia 21 to indicate the first date of the last menstruation, being disposed at the center of the parts, as shown in Fig. 1. The results are then read from the window 17, the day of next menstruation, and the window 19, the fertile days during the menstruation. Window 18 also indicates the day of ovulation. The process is then repeated, pointing the arrow 16 to the longest period of the menstrual cycle or oscillation, the reading of the window 19 then being taken in combination with the previous reading thereat to indicate the longest possible period of fertility or fertile days. On days other than those indicated in the two readings of window 19, pregnancy is impossible. The device it will be noted also indicates the ovulation day and the best day for fertilization for marriages not having children and who wish to have them. If the maximum probability of conception is desired, during the fertile days, toxics of various kinds should be avoided, for example alcohol and tobacco.

The above device is based on the theories of Dr. J. Smullders of Holland, and discoveries of Dr. K. Ogena of Japan and K. Knauss from Austria. Many devices have heretofore been proposed but have not been practical in that they do not adapt themselves to the oscillations or variations of the menstrual cycle. This device can be used for oscillations from 19 to 45 days, although if the oscillations are longer the device is less useful and it is best to consult the family physician.

The formula of Smullders is of the shortest oscillation of the menstrual cycle, subtracting 19, which provides the first sterile days before the fertile days and also of the longest oscillation, subtracting 10, which will provide the sterile days after the fertile days. For example, an oscillation from 26 to 30 days: 19 is subtracted from 26 to provide 7, the 7th is the last sterile day beginning from the first day of menstruation, and the longest oscillation 10 is subtracted from 30 to provide 20, the 20th being the first sterile day after the fertile period. Thus, the fertile days are from the 8th to the 19th and the rest are sterile.

Preferably, the menstrual cycle or oscillation will be checked over a period of twelve months and then the least and most number of days will be employed when using the device. In cases where this oscillation has not been determined, oscillations of 24 to 34 days will be employed, the first reading being taken with 24 and the second reading with 34.

The left hand side of the scale 21 will be employed for months of 31 days, while the right hand portion of the scale will be employed for months of 30 days.

While various changes may be made in the detail construction, it shall be understood that such changes shall be within the spirit and scope of the present invention as defined by the appended claims.

Having thus set forth and disclosed the nature of my invention, what is claimed is:

1. A menstrual cycle calculating device for a predetermined length of menstrual cycle comprising a top plate of sheet material, a bottom plate of sheet material, an intermediate disc of sheet material, means rotatably mounting said top and bottom plates and intermediate disc rotatably at the center of said disc, said disc having an inner circular portion concentric with said mounting means and divided into 61 equal spaces, said spaces each having an identifying number in the sequence from 1 to 30 and continuing from 1 to 31, said disc having an outer circular portion concentric with said mounting means and divided into 61 equal spaces, said second spaces each having an identifying number identical to those of said inner spaces, said top plate having a first window adapted to be aligned with said outer indicia of said disc to indicate the date of next menstruation, said top plate having a second elongated arcuate window adapted to be aligned with said outer indicia of said disc to illustrate a period of fertile days, said top plate having a third window adapted be aligned with said inner indicia on said disc to indicate the date of ovulation, said bottom plate having an inner circular portion concentric with said mounting means having 61 equal spaces, said spaces each having an identifying number in the sequence from 1 to 30 and continuing from 1 to 31, said inner indicia corresponding to the date of last menstruation, the first day thereof, indicating means carried by said top plate for cooperation with said bottom plate inner indicia, said bottom plate having an outer circular portion concentric with said mounting means and having 31 lines each being numbered from 19 to 49 consecutively, and indicating means cooperating with said outer indicia of said bottom plate fixedly carried by said intermediate disc, said outer indicia of said bottom plate corresponding to the duration of the menstrual cycle.

2. A menstrual cycle calculating device according to claim 1, said top and intermediate discs being substantially circular and of substantially the same diameter, said bottom disc being of substantially circular shape and having said second indicia around a portion of its periphery and said first indicia adjacent the peripheries of said top and intermediate discs.

3. A menstrual cycle calculating device according to claim 2, said top plate first window having a legend "Next Menstruation," said top plate second window having a legend "Fertile Days," said top plate third window having a legend "Ovulation."

4. A menstrual cycle calculating device according to claim 3, said top plate indicating means comprising an arrow on the upper surface thereof adapted to cooperate with said bottom plate inner indicia, said disc indicating means comprising an arrow integrally formed in the periphery thereof and adapted to cooperate with said bottom plate outer indicia.

No references cited.